United States Patent [19]

Merenkov et al.

[11] 4,392,786
[45] Jul. 12, 1983

[54] ELECTROMAGNETIC INDUCTION PUMP

[76] Inventors: Jury F. Merenkov, ulitsa Starykh bolshevikov, 84, korpus 2, kv. 30; Vladimir D. Egorov, ulitsa Krasnoflottsev, 28, kv. 6; Valentin G. Stepanov, ulitsa Malysheva, 107, korpus 1, kv. 28; Igor V. Popkov, ulitsa 8 Marta, 150, kv. 30, all of Sverdlovsk, U.S.S.R.

[21] Appl. No.: 197,668
[22] Filed: Oct. 16, 1980
[51] Int. Cl.$^3$ .................................. H02K 44/02
[52] U.S. Cl. ........................................ 417/50
[58] Field of Search .................... 417/50; 310/11

[56] References Cited

U.S. PATENT DOCUMENTS

| | | | |
|---|---|---|---|
| 3,141,413 | 7/1964 | Heyman | 417/50 |
| 3,837,763 | 9/1972 | Ertaud et al. | 417/50 |
| 3,973,878 | 8/1976 | LeFrere | 417/50 |

FOREIGN PATENT DOCUMENTS 2025074 of 1969 France.
804621 of 1958 United Kingdom.
1262269 of 0000 United Kingdom.

OTHER PUBLICATIONS

A.C. and D.C. Conduction Pumps for Liquid Metals by Blake, The Engineer, Oct. 19, 1956, pp. 541, et seq.
"A.C. and D.C. Conduction Pumps for Liquid Metals" by Blake in collected translations and reviews of foreign periodicals On Nuclear Power Engineering, issue 5, published in Russian in 1957, Moscow.
Ju. A. Bakanov, L. G. Vlasenko, S. E. Dvorchik, Ya. Ya. Zandart, V. K. Makarevich, V. E. Strizhak, I. M. Tolmach, S. R. Troitsky, "Experimental Research of Liquid Metal A.C. Conduction Machine", Magnetic Hydrodynamics, 1973, 2, 124–129.

Primary Examiner—Edward K. Look
Attorney, Agent, or Firm—Lilling & Greenspan

[57] ABSTRACT

An electromagnetic induction pump comprises an open magnetic circuit with an excitation winding. Installed in the air gap of the magnetic circuit is a duct for the flow of an electrically conductive liquid wherein electric current is induced. The pump further comprises a means for electrical continuity outside the air gap of the magnetic circuit. This means for electrical continuity is in electrical contact with the conductive liquid being pumped and partially embraces the magnetic circuit. At least the magnetic circuit portions adjoining the duct have a length l, in the direction of the liquid flow, which is defined by the expression:

$$l \geq 2\sqrt{2/\sigma\mu_o\omega},$$

where
$\sigma$ = the specific conductivity of the conductive liquid being pumped;
$\mu_o$ = the magnetic permeability of the conductive liquid being pumped; and
$\omega$ = the angular frequency of the alternating current source feeding the excitation winding, and provides a nearly exponential decrease of the magnetic induction in the duct along the length l, in the direction of the conductive liquid flow, to the value determined by the given length l.

12 Claims, 19 Drawing Figures

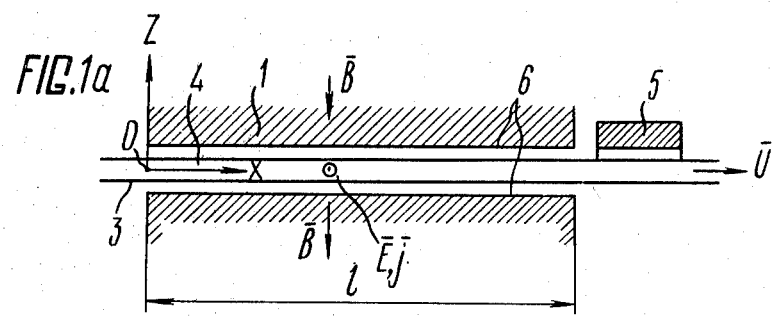
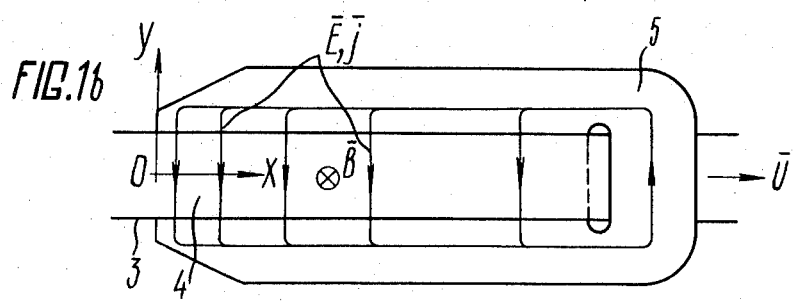
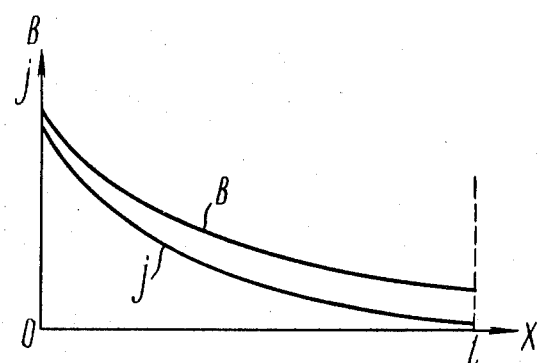

ELECTROMAGNETIC INDUCTION PUMP

FIELD OF THE INVENTION

The present invention relates to electromagnetic pumps for handling electrically conductive liquids, for example, liquid metals, and has particular reference to electromagnetic induction pumps. The invention may be used for pumping liquid metal heat transfer media in stationary atomic power plants, transport nuclear energy plants and other applications, where the medium being pumped is a heat transfer metal or an electrically conductive liquid. The invention may also find wide use in various fields of metallurgy and foundry for pumping and feeding melted metals.

BACKGROUND OF THE INVENTION

The requirements to be met by electromagnetic pumps vary with the field of application. They include high working pressure, increased efficiency, simple manufacture and high operational reliability. Specific parameters such as pump duct pressure per unit length and mass per unit power are essential to evaluating pump construction inasmuch as, eventually, they influence the cost of both the pump and its associated plant, as may be the case with transport power plants.

Nowadays particular attention is paid to development of electromagnetic induction pumps wherein the induction principle of action upon an electrically conductive liquid is carried out by an electromagnetic force produced in the conductive liquid due to interaction of a magnetic field set up by a pump inductor and an electric field induced in the conductive liquid.

The induction acting upon the conductive liquid is produced by two methods: first, a magnetic field varying with time and space (a running or rotating field) is set up by an inductor in the conductive liquid; second, a magnetic field varying only with time (a pulsating field) is set up in the conductive liquid by an inductor.

The first method requires an inductor of complicated construction, with the winding thereof distributed in the direction of the conductive liquid flow and installed in inductor slots after the manner of the stator of an asynchronous electric machine. The inductor winding is situated in the immediate vicinity of the duct for the conductive liquid flow and, therefore, handling liquid metals at a high temperature adversely affects the operational dependability of the pump. Low pressure developed per unit length of the inductor due to low magnetic induction in the duct resulting from saturation of the inductor teeth necessitates an increase of the pump dimensions in the direction of the conductive liquid flow. Lastly, the production of a distributed-winding inductor requires special equipment, which leads to a high pump cost.

With the second method, use is made of pulsating magnetic field inductors, which are very simple in construction, being essentially constituted by a magnetic circuit with customary transformer excitation windings. Inasmuch as the magnetic circuit has no tooth zone, substantial magnetic field induction can be produced in the conductive liquid being pumped, and therefore substantial pressure can be developed within a short length of the inductor. Furthermore, in such an inductor, the winding can be situated outside the zone of action of high temperature of the liquid being pumped, whereby the operational reliability of the pump is enhanced.

DESCRIPTION OF THE PRIOR ART

There are known electromagnetic induction pumps of many designs wherein use is made of pulsating magnetic field inductors.

It is believed at present that the greatest promise is offered by induction pumps with a pulsating magnetic field inductor, wherein an electric current is induced in the conductive liquid by means of transformers used either singly or in conjunction with the inductor magnetic circuit. It is considered that the motive force obtained is greatest if the electric current induced in the conductive liquid and the magnetic field are distributed uniformly in the direction of the liquid flow.

Nonuniform distribution of the magnetic field and the electric current in the conductive liquid in the direction of its flow is caused, firstly, by superimposing of the electric field in the liquid over the inductor field and interaction therewith in the manner of the armature reaction in electric machines and, secondly, by distortion of the electric field in the liquid due to a field of eddy currents induced in the liquid by the inductor magnetic field (see, for example, "AC and DC Electromagnetic Pumps for Liquid Metals" by Blake in collected translations and reviews of foreign periodicals "On Nuclear Power Engineering", issue 5, published in Russian in 1957, Moscow).

To make distribution of the magnetic field and the electric current in the conductive liquid more uniform, various solutions are resorted to, of which the most widely adapted are: first, employment of a compensating winding (like in direct current rotating electric machines), the electric current in the liquid being returned through a flat plate or through an opposite liquid flow in the same air gap of the inductor magnetic circuit; second, sectionalizing, in the planes perpendicular to the direction of the liquid flow, of the electrodes which supply current to the liquid from the secondary winding of the transformer inducing current in the liquid being pumped. The sectionalizing of the electrodes reduces eddy currents flowing across the flow of the liquid and, consequently, decreases distortion of the field in the liquid.

Serious problems are encountered in creating such pumps. One of them is that it is difficult to produce a high-induction magnetic field due to a large nonmagnetic gap of the inductor magnetic circuit. Another problem is that it is difficult to connect the sections of the electrodes to the conductive liquid duct and at the same time ensure that these sections are insulated from one another or there is a large resistance to eddy currents therebetween. Lastly, and this is the main disadvantage of such pumps, their working pressure and efficiency are low, and their size and mass are substantially large.

In the induction pumps with a pulsating magnetic field, wherein a compensating winding and sectionalized electrodes are not employed for providing uniform field distribution, the length of the inductor magnetic circuit in the direction of the conductive liquid flow is chosen so short that eddy currents induced in the liquid by the inductor magnetic field and passing through solid electrodes do not produce substantial distortion of the external field set up by the inductor.

It is considered that this condition must be met both in pumps combined with a transformer for generating current in the liquid being pumped and in pumps wherein the magnetic field set up by an inductor interacts with an electric current field induced in the liquid by that magnetic field.

Although such pumps feature a simple construction, they also suffer from the disadvantage that their working pressure and efficiency are low (see the reference to Blake's publication).

Known in the art is a alternating current electromagnetic pump (see, for example, French Pat. No. 2,025,074, class NO2n 4/00, dated 1969) wherein the duct for the flow of a conductive liquid is situated in the air gap of an open magnetic circuit. A busbar, which is connected through its electrodes to the duct, embraces a closed magnetic circuit comprising an excitation winding for generating an electric current in the conductive liquid being pumped. The busbar together with the electrodes is sectionalized into separate conductors in order to limit eddy currents in the conductive liquid being pumped and reduce field distortion caused in the duct due to the influence of those eddy currents. Besides, in order to compensate for the magnetic field of the currents flowing through the liquid being pumped, the busbar is passed through the air gap of the magnetic circuit, whereby an opposite electric current, with respect to the current in the liquid, is generated in the air gap through the height thereof. The technical solution described above results in a substantially uniform magnetic field in the duct.

However, this pump cannot develop high pressures (because of the uniformity of the magnetic field in the duct), has a complicated construction and a large size, and requires a large consumption of electrotechnical materials. Moreover, the pump has a complicated electrical supply circuit as there must be a specified phase shift between the voltages applied to the windings provided on the closed and open magnetic circuits.

Also known in the art is an alternating current electromagnetic pump (see, for example, Ju. A. Bakanov, L. G. Vlasenko, S. E. Dvorchik, Ya. Ya. Zandart, V. K. Makarevich, V. E. Strizhak, I. M. Tolmach, S. R. Troitsky "Experimental Research of Liquid Metal A.C. Conduction Machine", Magnetic Hydrodynamics, 1973, 2, 124–129) which differs from the previously discussed pump in that, instead of the compensating busbar, installed through the height of the magnetic circuit air gap is a second duct wherein the liquid being pumped flows in the direction opposite to the flow in the first duct and the electric current in the liquid likewise flows in the opposite direction. The busbar and the electrodes carrying current to the liquid are, likewise, sectionalized. The second duct, the same as the compensating busbar in the previously discussed pump, is provided for the purpose of uniform distribution of the magnetic field in the air gap. This pump suffers from the same disadvantages as the previously discussed one.

Apart from the description of the construction of said pump with a uniform magnetic field in the ducts, the reference cited hereinabove furnishes the results of the pump test. In the two ducts, which are in series hydraulic communication, the portion of each duct situated in the magnetic circuit air gap measuring 250 mm long, the pressure obtained in pumping liquid sodium does not exceed 1.3 kgf/cm² at a pump efficiency of not more than 5 percent.

Also known in the art is a single-phase alternating current pump (see, for example, "AC and DC Electromagnetic Pumps for Liquid Metals" by Blake in collected translations and reviews of foreign periodicals "On Nuclear Power Engineering", issue 5, published in Russian in 1957, Moscow, page 52, FIG. 9b) wherein a uniform magnetic field is set up in the magnetic circuit air gap. The uniformity of the magnetic field is catered for by fitting a sectionalized compensating busbar in the air gap. In this construction, the transformer supplying electric current to the duct with a conductive liquid flowing therein is united with an open magnetic circuit and also serves for inducing a magnetic field in the magnetic circuit air gap. The results of the pump test furnished in the reference cited hereinabove show that the maximum pressure developed by that pump in handling mercury is 1.2 kgf/cm² at an efficiency of 6.5 percent.

Thus, as proved by tests, electromagnetic pumps with a uniform magnetic field in the magnetic circuit air gap show poor performance, giving substantially low pressure and efficiency.

Also known in the art is an electromagnetic pump for liquid metals (see, for example, U.S. Pat. No. 3,837,763, dated 1972), comprising an open magnetic circuit with a winding for setting up a magnetic field in the liquid metal being pumped and a closed magnetic circuit with a winding for inducing electric current in the liquid metal. In the liquid metal being pumped electric current is induced by means of a closed liquid metal coil arranged to embrace the closed magnetic circuit, there being no metal flow in the coil. The duct with the liquid metal being pumped is a part of that liquid metal coil and, together with a return current circuit formed by the same liquid metal coil, is situated in the air gap of the open magnetic circuit.

Due to uniformity of the magnetic field in the magnetic circuit air gap, this pump, in common with those discussed previously, develops low pressure and has low efficiency, the size and mass of the pump being substantially large. Moreover, during pump operation the liquid metal does not flow through the closed coil and the condition of that liquid metal depends on the pump operating temperature. The metal may overheat in the coil portion where the metal is immobile, if too much heat is emitted, and, conversely, it may cool if insufficient heat is supplied.

Also known in the art is an electromagnetic induction pump for liquid metals (see, for example, British Pat. No. 804,621, class 35, AIX, dated 1958), wherein the duct for the flow of a liquid metal is situated inside the poles of a three-pole magnetic circuit with a three-phase excitation winding which induces a three-phase magnetic field in the duct. An electric current is fed to the duct by means of secondary coils embracing the yokes of the magnetic circuit and connected to respective electrodes which are in electrical contact with the duct.

In this construction, the varying magnetic field in the duct induces currents in the liquid metal being pumped. These eddy currents do not take part in building up useful pressure, but reduce the efficiency of the pump, whereas the currents which take part in building up pressure are fed to the liquid metal by the use of secondary coils.

This pump suffers from the same disadvantages as single-phase pumps with a uniform magnetic field in the duct, i.e. it develops low pressure and has low efficiency. Furthermore, this pump has a complicated system for inducing an electric current and feeding it to the duct by means of large-section secondary coils.

The simplest solution is found in another single-phase electromagnetic induction pump of the prior art (see, for example, the previous reference to Blake's publication, page 52, FIG. 9g) which comprises an open magnetic circuit with a single-phase excitation winding connected to an alternating current source, the magnetic circuit air gap accommodating a duct for the flow of a conductive liquid wherein electric current is induced. Connected to the duct is an electric busbar which partially embraces the magnetic circuit and, at the outlet, as regards the direction of the conductive liquid flow, end of the duct, provides a path for eddy currents induced in the conductive liquid being pumped.

The eddy currents induced by the pulsating magnetic field set up across the magnetic circuit air gap flow through the conductive liquid in the magnetic circuit air gap in one direction and pass through the busbar outside the magnetic circuit air gap in the opposite direction. Interaction of the magnetic field set up in the magnetic circuit air gap and the electric current induced in the conductive liquid produces an electromagnetic force in that liquid whereby it is pumped.

According to the customary idea that the maximum effect of the electromagnetic force is obtained with a substantially uniform magnetic field in the duct, the duct is dimensioned so as to minimize distortion of the magnetic field caused therein by the eddy currents in the conductive liquid. For the same purpose, it is proposed that the frequency of the current feeding the excitation winding be reduced (see Blake's publication).

This pump is of simple construction, has small size and mass, and is provided with a simple electrical supply system, yet the performance thereof is even below that of the previously discussed pumps with a pulsating magnetic field (see Blake's publication, page 52). This is attributed first of all to the fact that, in the case of the pumps with separately fed windings for setting up a magnetic field in the duct and inducing current in the liquid (i.e. the windings of the open and closed magnetic circuits respectively), the magnetic field and the current in the liquid can be brought into phase by virtue of an appropriately chosen phase shift between the voltages applied to said windings, whereas in the pump under consideration this object is achieved only by recourse to leakage reactance of the secondary coil formed by the liquid and the busbar.

The analysis of the various constructions of electromagnetic pumps employing a pulsating magnetic field has shown that all of them are of little effectiveness and cannot develop high pressure, their use being limited to applications where high pressures are not required. The major considerations in deciding the construction of such pumps are simplicity and operational dependability.

SUMMARY OF THE INVENTION

It is an object of the present invention to provide an effective electromagnetic induction pump capable of developing high pressure at increased efficiency without complication of the pump construction.

It is another object of the present invention to improve specific pump parameters, viz: duct pressure per unit length and mass per unit power.

It is still another object of the present invention to provide a pump capable of handling electrically conductive liquids which cannot be in electrical contact with hard electrodes.

It is still another object of the present invention to increase pump output.

It is still another object of the present invention to stabilize in time the pressure developed by the pump.

These objects are achieved in an electromagnetic induction pump comprising an open magnetic circuit with an excitation winding connected to a source of alternating current, the air gap of that magnetic circuit accommodating a duct for the flow of an electrically conductive liquid wherein electric current is induced; and a means for electrical continuity outside the air gap of the magnetic circuit, which is in electrical contact with the conductive liquid being pumped and partially embraces the magnetic circuit. According to the invention, at least magnetic circuit portions adjoining the duct for the flow of an electrically conductive liquid have a length l, in the direction of the liquid flow, which is defined by the expression:

$$l \geq 2 \sqrt{2/\sigma \mu_0 \omega},$$

where
- $\sigma$ = the specific conductivity of the conductive liquid being pumped;
- $\mu$ = the magnetic permeability of the conductive liquid being pumped; and
- $\omega$ = the angular frequency of the alternating current source feeding the excitation winding, and provides nearly a exponential decrease of the magnetic induction in the duct along the length l in the direction of the liquid flow to the value determined by the given length l.

It is expedient that, with the means for electrical continuity outside the air gap of the magnetic circuit being constructed as a busbar partially embracing the magnetic circuit portion adjoining the duct at the outlet, as regards the direction of the flow, end thereof, that pump should comprise at least one additional duct for the flow of an electrically conductive liquid and as many additional busbars as there are additional ducts. The additional ducts should be situated in the air gap of the magnetic circuit, there being no overlap with the adjacent duct in the direction of the magnetic field in the air gap; and, the additional busbars should be in electrical contact with the conductive liquid flowing in the respective duct and partially embrace the magnetic circuit portion adjoining the duct, so that the conductive liquid in each additional duct should flow in the same or in the opposite direction with respect to the flow in the adjacent duct. The busbars of the adjacent ducts are electrically interconnected in order to intensify a decrease of the magnetic induction in the main and additional ducts, the direction of the induction decrease in each of the additional ducts being, respectively, the same or opposite to the disection of the induction decrease in the adjacent duct.

It is further expedient that, with the conductive liquid flowing in each additional duct in the direction opposite to the direction of flow in the adjacent duct, the main and additional ducts should be in series communication in order to create a united flow of the conductive liquid and set up successive magnetic fields of decreasing induction in the direction of that united flow.

It is still further expedient that the pump should comprise a chamber with inlet and outlet pieces designed for the conductive liquid being pumped to go in and out and situated at different levels. The chamber should be formed by the walls of two tube portions situated one inside the other, and the peripheral portion of the chamber should be situated in the air gap of the magnetic circuit and constitute the duct for the flow of an electrically conductive liquid, and the other portion of the chamber should be situated outside the air gap. The electrically conductive liquid conveyed therein by the action of electromagnetic forces produced in the chamber part situated in the air gap should provide a means for electrical continuity outside the air gap of the magnetic circuit in order to create a decrease of the magnetic induction in the chamber part situated in the air gap of the magnetic circuit, from the chamber end whereat the magnetic circuit is situated inside the inner tube protion forming that chamber to the other end thereof.

It is still further expedient that the chamber part situated outside the air gap of the magnetic circuit should be provided with partitions disposed in the length of the chamber so as to limit circulation of the conductive liquid inside the chamber, which circulation originates on the borders between the chamber part situated in the air gap and the other chamber part.

It is still further expedient that the partitions should be constructed as plates installed in two rows perpendicular to the direction of the conductive liquid flow in the chamber part situated in the air gap of the magnetic circuit, the working edges of each of the plates being located on the respective border between the chamber parts.

It is still further expedient that use should be made of a three-pole open magnetic circuit with a three-phase excitation winding and each of the phases be provided with a means for electrical continuity outside the air gap of the magnetic circuit. The means should be constructed as a busbar partially embracing the respective portion of the magnetic circuit, which adjoins a duct for the flow of an electrically conductive liquid at the outlet, as regards the direction of the flow, end thereof, which duct should be cylindrically shaped. The portions of the magnetic circuit which adjoin the duct should be approximately equidistantly spaced around the circumference thereof; and the busbars should be electrically interconnected in order to set up in the duct identical magnetic fields of decreasing induction spaced apart 120° with respect to time.

It is still further expedient that within the length of the duct for the flow of an electrically conductive liquid provision should be made of two additional three-pole open magnetic circuits, each having a three-phase excitation winding, each phase of which has a busbar that serves as a means for electrical continuity outside the air gap of the magnetic circuit and partially embraces the respective portion of the magnetic circuit which adjoins the duct at the outlet, as regards the direction of the conductive liquid flow, end thereof. The portions of the additional magnetic circuits which adjoin the duct are disposed like such portions of the main magnetic circuit and having a length, in the direction of the conductive liquid flow, equal to the length of such portions of the main magnetic circuit. The excitation windings of the additional magnetic circuits are connected to a three-phase electric current source in such a manner that in each additional magnetic circuit the phases differ by 120° from the preceding, as regards the direction of the conductive liquid flow, magnetic circuit in order to produce phase sequence matched to the circumference and length of the duct and set up, in the portions of the duct situated between the poles of the respective additional magnetic circuit, a magnetic field of decreasing induction differing in time by 120° from such a magnetic field of the preceding, as regards the direction of the conductive liquid flow, magnetic circuit.

It is still further expedient that at least one of the magnetic circuit portions adjoining the duct for the flow of an electrically conductive liquid should be constructed as a pole piece with at least one of the ends thereof, that being an outlet end as regards the direction of the conductive liquid flow, extending beyond the magnetic circuit, and the areas of cross sections of that extending end taken along the length thereof in the direction of the conductive liquid flow should be such that each cross section ensures passage of the magnetic flux determined for this section by said law of magnetic induction decrease along the length l of the pole piece.

BRIEF DESCRIPTION OF THE DRAWINGS

The invention will now be more particularly described by way of example with reference to the accompanying drawings, wherein:

FIGS. 1a and 1b are fragmentary diagrammatic views of an electromagnetic induction pump according to the invention, showing the duct in the magnetic circuit air gap in the planes XZ and XY;

FIG. 3 is a graph, showing curves for decrease of the magnetic induction B and the current density $\bar{j}$ along the length l according to the invention;

DETAILED DESCRIPTION OF THE INVENTION

Figure 2:
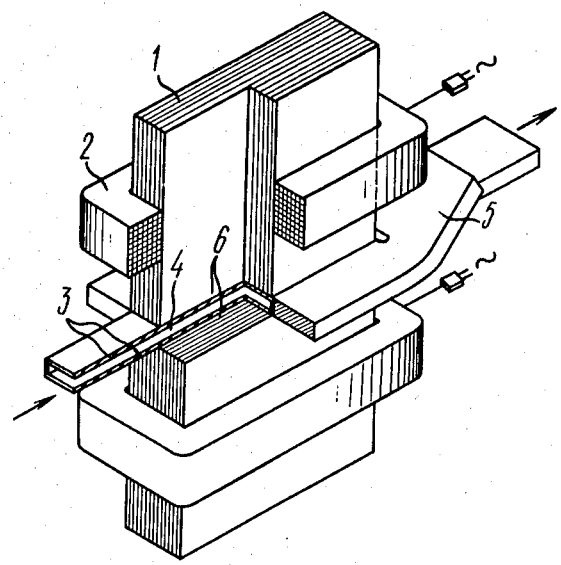
FIG. 2 is a fragmentary axonometric view of an electromagnetic induction pump, according to the invention.

An electromagnetic induction pump of the present invention comprises an open magnetic circuit 1 (FIGS. 1a, 1b, and FIG. 2) with an excitation winding 2 (FIG. 2) connected to an alternating current source. The air gap of the magnetic circuit 1 (FIGS. 1 and 2) accommodates a duct 3 for the flow of an electrically conductive liquid and a means for electrical continuity outside the magnetic circuit air gap, which means is in electrical contact with the conductive liquid 4 being pumped and partially embraces the magnetic circuit 1. In this particular embodiment of the invention, the means for electrical continuity is constructed as a busbar 5.

As least the portions 6 of the magnetic circuit 1 which adjoin the duct 3 for the flow of a conductive liquid have a length l in the direction of the liquid flow which is defined by the expression:

$$l \geq 2\sqrt{2/\sigma\mu_o\omega},$$

where
- $\sigma$ = the specific conductivity of the conductive liquid 4 being pumped;
- $\mu$ = the magnetic permeability of the conductive liquid 4 being pumped;
- $\omega$ = the angular frequency of the alternating current source feeding the excitation winding 2 (FIG. 2);

and provides a nearly exponential decrease of the magnetic induction in the duct 3 along the length l in the direction of the liquid flow to the value determined by the given length l.

With the duct 3, which is accommodated in the air gap of the magnetic circuit 1, and the means for electrical continuity, viz. the busbar 5, located in relation to coordinate axes as shown in FIGS. 1a and 1b, the vector $\overline{B}$ of the magnetic induction has its direction along the axis Z, the vector $\overline{E}$ of the electric field strength and the vector $\overline{j}$ of the current density in the conductive liquid 4 have their direction along the axis Y, and the vector $\overline{U}$ of the velocity of the conductive liquid has its direction along the axis X.

According to the invention, the length l of the parts 6 of the magnetic circuit 1 which adjoin the duct 3 is chosen by solving the electromagnetic field equations, whose simplest form, in accordance with FIGS. 1a and 1b is as follows:

$$-\frac{d\dot{B}}{dx} = \mu_o \dot{j}; \tag{1}$$

$$\frac{d\dot{E}}{dx} = -i\omega\dot{B}; \tag{2}$$

$$\dot{j} = \sigma(\dot{E} - U\dot{B}), \tag{3}$$

where
$\dot{B}$, $\dot{j}$ and $\dot{E}$ = values varying sinusoidally with time in each point of the conductive liquid being pumped;
i = imaginary unity.

Interaction of a magnetic field having an induction $\dot{B}$ and an electric current having a density $\dot{j}$ in a conductive liquid in the duct for a length l produces an electromagnetic pressure which is defined by the known equation:

$$\Delta p = \int_0^l Re[\dot{j}\overset{*}{B}]dx \tag{4}$$

(*means a conjugate complex number).

In the equation (4)

$$Re[\dot{j}\overset{*}{B}] = Re\dot{j}Re\dot{B} + Im\dot{j}Im\dot{B} \tag{5}$$

where Re and Im = real and imaginary parts of the complex number respectively.

Putting the value for the current density j from the equation (1) into equation (5), we get:

$$Re[\overset{*}{j}\dot{B}] = -\frac{1}{\mu_o}\left[\frac{d(Re\dot{B})}{dx} \cdot Re\dot{B} + \frac{d(Im\dot{B})}{dx} \cdot Im\dot{B}\right] \tag{6}$$

Integration of the equation (4) with respect to (6) for the length l gives:

$$\Delta p = \frac{1}{4\mu_o}(B_o^2 - B_l^2) \tag{7}$$

where $B_o$ and $B_1$ = the amplitude of the magnetic induction on the boundaries of the air gap at the inlet and outlet ends of the duct 3 respectively, as regards the direction of the flow of the conductive liquid 4.

It is seen from the equation (7) that the electromagnetic pressure produced in the duct 3 increases with a decrease in the amplitude of the induction of the magnetic field in the duct 3 along the length l in the direction of the flow of the conductive liquid 4, reaching a maximum when $B_1 \to 0$.

Thus, applying voltage to the winding 2 (FIG. 2) sets up in the air gap of the magnetic circuit 1 a magnetic field whose induction B (FIG. 3) decreases in the direction of the conductive liquid flow, and produces a current of the density j which flows in the conductive liquid 4 (FIG. 1) and passes through a continuous path provided outside the air gap of the magnetic circuit 1 by the busbar 5.

The manner in which the amplitude of the magnetic induction decreases along the length l is found from the induction equation written by means of the system of equations (1–3) for the nondimensional value B of the magnetic induction and the coordinate X related to the length:

$$\frac{d^2\dot{B}}{dx^2} - Re_m \frac{d\dot{B}}{dx} - i2\lambda^2 \dot{B} = 0 \tag{8}$$

where
$Re_m = \sigma\mu_o U l$ = Reynolds magnetic number;

$$\lambda = l\sqrt{\frac{\sigma\mu_o\omega}{2}} = \text{skin effect parameter.}$$

Solving the induction equation (8):

$$\dot{B} = \dot{C}_1 e^{\alpha x} + \dot{C}_2 e^{\beta x} \tag{9}$$

$$\alpha = \frac{Re_m}{2} + \sqrt{\left(\frac{Re_m}{2}\right)^2 + 2\lambda^2 i} \tag{10}$$

$$\beta = \frac{Re_m}{2} - \sqrt{\frac{Re_m}{2} + 2\lambda^2 i} \tag{11}$$

where $\dot{C}_1$ and $\dot{C}_2$ = integration constants determined by the boundary conditions.

Using equations (1) and (9), the current density in the conductive liquid being pumped is:

$$j = -(\dot{C}_1 e^{\alpha x} + \dot{C}_2 e^{\beta x}).$$

Hence, both the magnetic flux and the current density decrease nearly exponentially along the length l in the direction of the liquid flow. In other words, the magnetic induction B decreases according to the above mentioned principle.

One of the necessary boundary conditions is the strength of the electric field in the conductive liquid 4 on the boundary of the air gap of the magnetic circuit 1 at the outlet, as regards the direction of the conductive liquid flow, end of the duct 3. Due to the provision of the means for electrical continuity outside the magnetic circuit gap, the strength of the electric field is to be near zero. With this condition obtained, the magnetic induction decreases nearly exponentially in the direction of the conductive liquid flow (see equation (9)) to the value determined by the given length l of the magnetic circuit portions 6 adjoining the duct 3.

Some deviation of magnetic induction decrease along the length l from the exponential law may be related to various edge effects which are brought about by the fact that the current induced in the conductive liquid 4 flows beyond the air gap of the magnetic circuit 1 and the magnetic field bulges out beyond the boundaries of the air gap.

Figure 4:
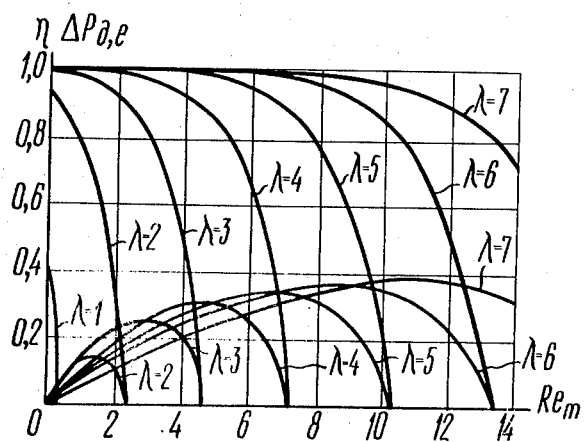
FIG. 4 shows the pressure $\Delta p$ and the efficiency $\eta$ in the pump duct versus the Reynolds magnetic number $Re_m$ at various values of the skin effect parameter $\lambda$ according to the invention.

By numerical analysis of the aforementioned relations, a graph is plotted (FIG. 4) showing the electromagnetic pressure related to its maximum value $\Delta p_{max} = B_o^2/4\mu_o$ and the efficiency of the duct versus the Reynolds magnetic number $Re_m$ at various values of the skin effect parameter $\lambda$.

It is seen from this graph that the pressure developed by the pump at $Re_m = 0$, i.e. when the conductive liquid is at rest, begins approaching its maximum value $\Delta p_{max}$ at $$\lambda = l\sqrt{\frac{\sigma\mu_o\omega}{2}} \geq 2$$

Therefore, this invention is essentially based on the length l of the magnetic circuit portions 6 (FIGS. 1 and 2) adjoining the duct 3 which is derived from the last relation, i.e.:

$$l \geq 2\sqrt{2/\sigma\mu_o\omega} \tag{12}$$

Thus, at $\lambda \geq 2$ the induction of the magnetic field decreases, in accordance with the equation (7), along said length l, nearing zero.

The upper limit for l is determined by the nondimensional parameter $\lambda$ (FIG. 4) which provides for obtaining the required pressure at the appropriate Reynolds magnetic number $Re_m$.

An embodiment of the invention is advantageous wherein a continuous path for the current induced in the conductive liquid 4 (FIG. 5) is provided by a busbar 7 made of an electrically conductive material, for example, copper, which busbar is in electrical contact with the conductive liquid 4 and partially embraces the magnetic circuit portion 6 adjoining the duct 3 at the outlet, as regards the direction of the conductive liquid flow, end thereof. Provision is made for at least one additional duct 8 for the flow of the conductive liquid and as many additional busbars 9 as there are additional ducts. The additional duct 8 is situated in the air gap of the magnetic circuit 1 after the main duct 3 in a direction perpendicular to that of the conductive liquid flow, without overlapping in the direction of the magnetic field in the air gap. The additional busbar 9 is in electrical contact with the conductive liquid flowing in the additional duct 8 and partially embraces the magnetic circuit portion 6 adjoining the additional duct 8 at the outlet, as regards the direction of flow of the conductive liquid 4, end thereof. With the busbar 9 situated as described herein, the direction of the conductive liquid flow in the additional duct 8 is opposite to that in the main duct 3. An embodiment is possible wherein the direction of the conductive liquid flow in the additional duct 8 is the same as that in the main duct 3.

The busbars 7 and 9 of the ducts 3 and 8 are electrically interconnected (in a general case, adjacent busbars are interconnected). The currents induced in the ducts 3 and 8 have opposing directions in the interconnected portion 10 of the busbars 7 and 9, due to which the cross section of that portion 10 may be smaller than the cross section of the busbars 7 and 9 outside the portion 10.

Interconnection of the busbars in all the possible embodiments proposed herein intensifies the decrease of the magnetic induction in the main and additional ducts, the direction of induction decrease in each of the additional ducts being the same as or opposite to that in the adjacent duct.

The magnetic circuit 1 may be made of sheet or coiled electrical steel. The main duct 3 and the additional duct 8 may be made of metal, for example, steel.

The electrical contact of the busbars 7 and 9 with the conductive liquid 4 may be effected by soldering or welding them to the metal ducts, or by introducing them directly into the conductive liquid 4.

Figure 6:
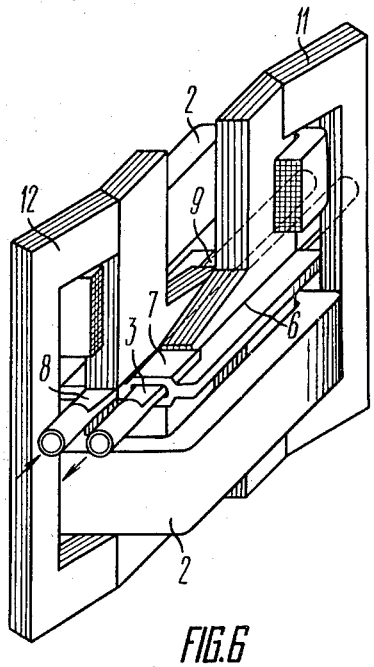
FIG. 6 is an axonometric view of an electromagnetic induction pump according to the invention, wherein the main duct and the additional duct have separate open magnetic circuits.

Another embodiment of an open magnetic circuit is possible, wherein separate magnetic circuits 11 (FIG. 6)

and 12 are provided, each adjoining either the main duct 3 or the additional duct 8.

Figure 7:
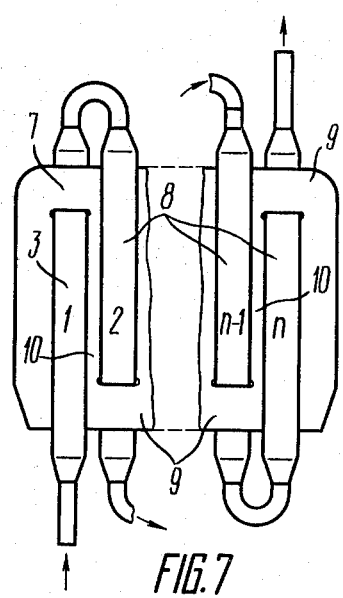
FIG. 7 is a fragmentary diagrammatic plan view of an electromagnetic induction pump according to the invention, wherein the main duct and n-1 additional ducts are in series communication (a break being taken on the busbar and the duct)

For one pump to produce a pressure exceeding the capability of a single duct, which is limited by the magnetic circuit saturation induction, an embodiment may be used wherein the main duct 3 and the additional ducts 8 are in series communication, as shown in FIG. 7, in order to create a united flow of the conductive liquid and set up successive magnetic fields of decreasing induction in the direction of that united flow.

In this case, if the flow areas of the main duct 3 and the additional ducts 8 are equal and, consequently, the velocities of the conductive liquid flows therein are also equal, decrease of the magnetic induction in the direction of the conductive liquid flow occurs in these ducts in the same manner, in accordance with equation (9).

Figure 8:
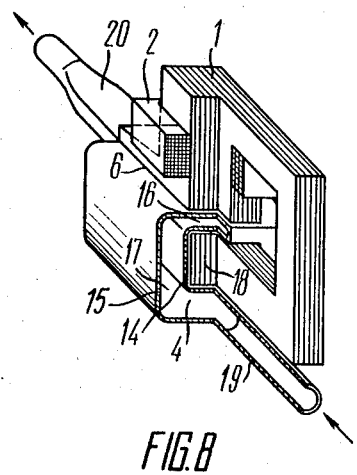
FIG. 8 is an axonometric view of an electromagnetic induction pump according to the invention, wherein a chamber containing a conductive liquid serves as a means for electrical continuity.

For conductive liquids to be pumped without recourse to electrical contact between a hard busbar and the liquid being pumped, use may be made of a pump embodiment which is substantially analogous to that shown in FIG. 2 and further comprises a chamber formed by the walls of two tube portions situated one inside the other, viz. an inner tube portion 14 (FIG. 8) and an outer tube portion 15. The peripheral part 16 of the chamber is situated in the air gap of the magnetic circuit 1 and constitutes the duct for the flow of the conductive liquid 4. The other part 17 of the chamber is situated outside the air gap, and the conductive liquid 4 conveyed therethrough by the action of electromagnetic forces produced in the chamber part 16 provides a means for electrical continuity outside the air gap of the magnetic circuit 1.

In this embodiment, part of the magnetic circuit 1 is constituted by a piece 18 which adjoins the chamber part 16 situated in the air gap of the magnetic circuit 1 and is installed inside the inner tube portion 14 at one end thereof in order to cater for decrease of the magnetic induction in the chamber part 16 from the chamber end whereat the magnetic circuit piece 18 is installed inside the inner tube portion 14 to the other end of the chamber.

The chamber has an inlet piece 19 and an outlet piece 20 which are designed for the conductive liquid being pumped to go in and out and are situated at different levels. In this embodiment, the outlet piece 20 is a continuation of the chamber part 16 situated in the air gap of the magnetic circuit 1, whereas the inlet piece 19 is located at the bottom level of the chamber part 17 situated outside the air gap, whereby provision is made for the conductive liquid 4 being pumped to flow throughout the volume of the chamber, for the chamber to be fully primed with the conductive liquid 4 before starting up the pump, and for the conductive liquid 4 to be drained from the chamber after the pump is disconnected from the alternating current source.

In order to reduce electrical resistance to the current circulating in the conductive liquid 4 around the piece 18 of the magnetic circuit 1, the chamber part 17 situated outside the air gap of the magnetic circuit 1 may have a larger cross section for the passage of the electric current than the chamber part 16 situated in the air gap of the magnetic circuit 1.

The chamber consisting of the two parts 16 and 17 may be made of an electrically conductive material such as steel, as well as of an insulating material such as ceramic or graphite.

Figure 9:
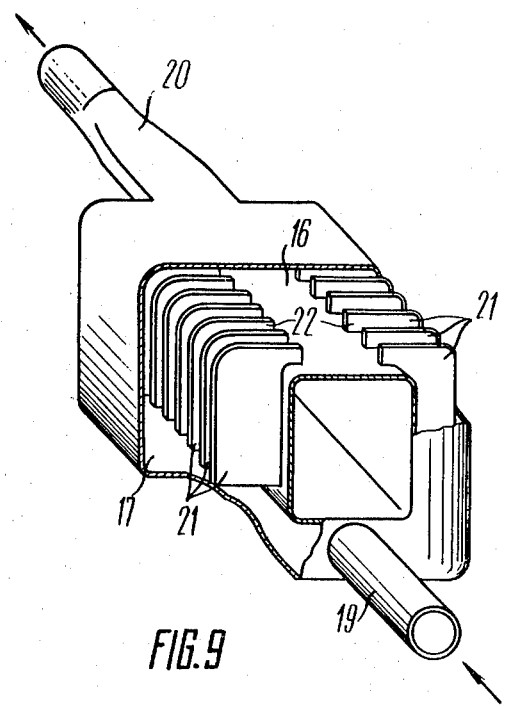
FIG. 9 is an axonometric view of the chamber wherein the partitions are constructed as plates according to the invention.

The chamber is provided with partitions 21 (FIG. 9) in order to increase the pump pressure by restricting circulation of the conductive liquid 4 in the chamber, which circulation originates on the borders between the chamber part 16 situated in the air gap of the magnetic circuit 1 and the chamber part 17.

The partitions 21 are constructed as plates installed in two rows in the chamber part 17 situated outside the air gap of the magnetic circuit 1, the working edges 22 of each of the plates being located on the respective border between the chamber parts 16 and 17 situated, respectively, inside and outside the air gap of the magnetic circuit 1. The partitions 21 are disposed in the chamber throughout its length 1 defined by equation (12) and perpendicular to the direction of the conductive liquid flow in the chamber part 16 situated in the air gap of the magnetic circuit 1. The area and thickness of the partitions 21 are such that they do not prevent the conductive liquid from flowing by way of the inlet piece 19 into the chamber and therethrough between the partitions 21 into the chamber part 16 situated in the air gap of the magnetic circuit 1. The partitions 21, like the chamber itself, may be made of either a conductive or an insulating material.

The output of the single-phase pump embodiments described hereinbefore is limited by the flow area of the duct for a conductive liquid which, in turn, is limited by the fact that excessive increase of said flow area reduces pump effectiveness. Thus, excessive increase of the height of the flow area (the dimension in the direction of the magnetic field in the magnetic circuit air gap) leads to excessive increase of the excitation winding and increase of its stray fluxes, whereas due to excessive increase of the width of the flow area, the current induced in the conductive liquid excessively spreads beyond the magnetic circuit air gap at the inlet, as regards the conductive liquid flow, end of the duct. The current which spreads beyond the magnetic circuit air gap does not take part in building up pressure, but causes reduction in pump efficiency. Furthermore, the use of a powerful single-phase pump leads to asymmetrical loading of the phases of a three-phase power source.

It may, therefore, be advantageous to provide a pump embodiment wherein use is made of a three-pole open magnetic circuit 23 (FIGS. 10 and 11) with a three-phase excitation winding 24, and each of the phases is provided with a means for electrical continuity outside the magnetic circuit air gap constructed as a busbar 25 partially embracing the respective portion 6 of the magnetic circuit 23 (portion of pole 26) the portion 6 adjoins a duct 27 for the flow of an electrically conductive liquid at the outlet, as regards the direction of the conductive liquid flow, end of that duct. The duct 27 is cylindrically shaped and the portions 6 of the magnetic circuit 23, which adjoin the duct 27, are approximately equidistantly spaced around the circumference thereof. The busbars 25 are electrically interconnected. With this construction of the pump, each phase sets up in the duct 23 identical magnetic fields of decreasing induction which are displaced 120° in time.

Another embodiment is possible wherein the duct 27 is cylindrically shaped and has an annular flow area. In this case a core 28 of a magnetic material is installed in the internal space of the duct.

In each duct of a single-phase pump or in the duct of each phase of a three-phase pump, pressure is built up which pulsates in time at twice the frequency of the current feeding the excitation winding. The value of this pressure, averaged with respect to time, is limited by saturation of the magnetic circuit adjoining the duct.

Figure 12:
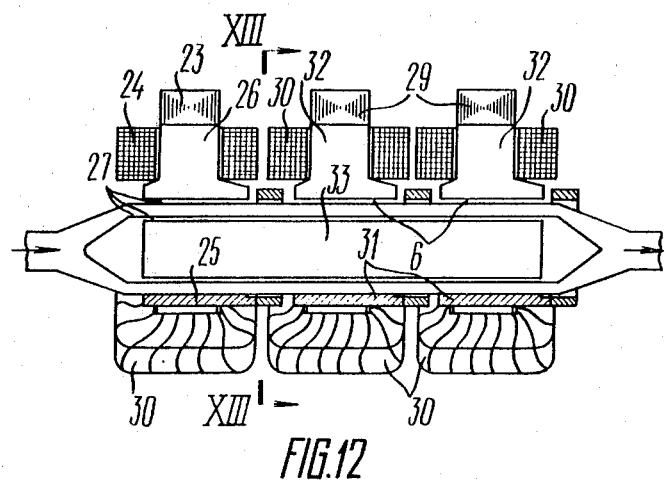
FIG. 12 is a longitudinal sectional view of a three-phase electromagnetic induction pump according to the invention, wherein the duct is cylindrically shaped and additional three-pole magnetic circuits are provided within the duct length.
Figure 13:
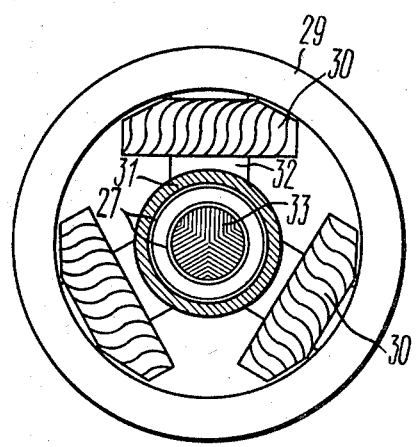
FIG. 13 is a sectional view along the line XIII—XIII of FIG. 12 according to the invention.

In order to raise pressure and stabilize it in time, a pump embodiment may be advantageous, wherein, besides the main magnetic circuit 23 (FIGS. 12 and 13) with the three-phase excitation winding 24, within the length of the duct 27 for the flow of an electrically conductive liquid provision is made for two additional open magnetic circuits 29, each having a three-phase excitation winding 30, each phase of which has a busbar 31 that serves as a means for electrical continuity outside the air gap of the magnetic circuit 29 and partially embraces the portion 6 of the respective pole 32 of that magnetic circuit 29 which adjoins the duct 27 at the outlet, as regards the direction of the conductive liquid flow, end of that duct. The portions 6 which adjoin the duct 27 are disposed like such portions 6 of the main magnetic circuit 23 and have a length, in the direction of the conductive liquid flow, equal to the length of such portions 6 of the main magnetic circuit 23. The excitation winding 30 of the additional magnetic circuits 29 is connected to a three-phase electric current source in such a manner that in each additional three-phase magnetic circuit 29 the phases differ by 120° from the preceding, as regards the direction of the conductive liquid flow, magnetic circuit 23 and 29, respectively, in order to produce a sequence of the phases A, B and C (FIG. 14) matched to the circumference and length of the duct 27 (FIGS. 12 and 13) and set up, in the portion of the duct 27 situated between the poles 32 of the respective additional magnetic circuit 29, a magnetic field of decreasing induction differing in time by 120° from such a magnetic field of the preceding, as regards the direction of the conductive liquid flow, magnetic circuit 23 and 29, respectively. The internal space of the duct 27 having an annular flow area accommodates, likewise in the previous embodiment, a core 33 (FIG. 13).

Figure 15:
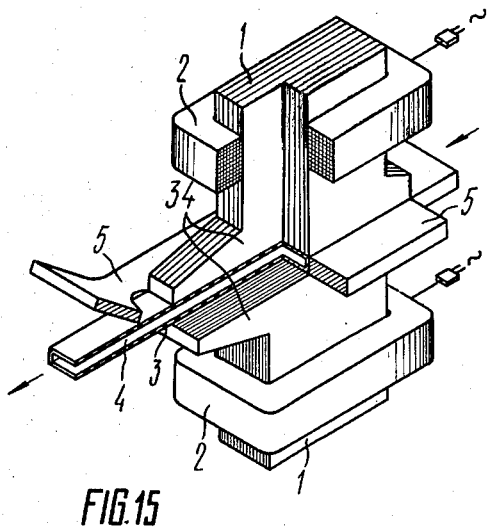
FIG. 15 is a fragmentary axonometric view of an electromagnetic induction pump according to the invention, wherein the magnetic circuit portions adjoining the duct are constructed as pole pieces.
Figure 16:
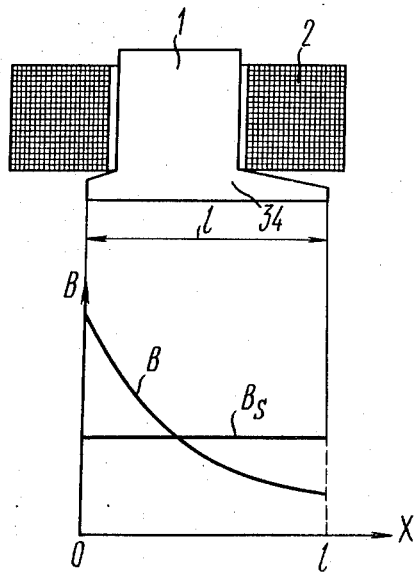
FIG. 16 shows a diagrammatic longitudinal sectional view of a part of a magnetic circuit with a winding, wherein a pole piece is displaced in the direction of decrease of the magnetic induction B, and further shows a curve for decrease of the magnetic induction B according to the invention.

In order to diminish consumption of electrotechnical materials and, consequently, reduce the pump mass per unit power, an embodiment may be provided wherein at least one of the portions 6 (FIG. 2) of the magnetic circuit 1 which adjoin the main duct 3 or the additional duct 8 (FIG. 6) for the flow of an electrically conductive liquid is constructed as a pole piece 34 (FIG. 15). This pole piece 34 is situated so that at least one of the ends thereof, that being an outlet end as regards the direction of the conductive liquid flow, extends beyond the magnetic circuit 1. The areas of cross sections of those extending ends taken along the length thereof in the direction of the conductive liquid flow are such that each cross section ensures passages of the magnetic flux determined for this section by said law of decrease of the magnetic induction B (FIG. 16) along the length l of the pole piece 34. The pole pieces are also shown in FIGS. 6, 8, 11, and 12.

The magnetic flux passing through each cross section of the extending ends of the pole piece 34 is determined by integration of said law of decrease of the magnetic induction along the length of the extending portion of the pole piece 34 from the end thereof to each section in question, that is by integrating the law of decrease of the magnetic induction B. The cross sectional area of the magnetic circuit 1 is to measure so as to ensure passage of the full magnetic flux flowing through the air gap of the magnetic circuit 1 and is determined by integration of said law of decrease of the magnetic induction B throughout the given length l of the pole piece 34, i.e. by the average induction $B_s$ FIG. 16 of the magnetic field in the air gap of the magnetic circuit 1, the value of which is defined by said law of decrease of the magnetic induction along the length l of the pole piece.

In FIGS. 1, 2, 5, 6, 7, 8, 9, 11, 12, and 15 the direction of the conductive liquid flow is indicated by arrows.

The conductive liquid 4 (FIG. 1) in the duct 3 of the proposed electromagnetic induction pump is caused to flow by interaction of the magnetic field set up in the air gap of the magnetic circuit 1 by virtue of the excitation winding 2 (FIG. 2) and the magnetic field of the electric current j induced in the conductive liquid 4 by the magnetic field of the excitation winding 2. As a result of this interaction, a resultant magnetic field is set up in the air gap of the magnetic circuit 1 whose induction B decreases in the direction of flow of the conductive liquid 4 due to the provision of the means for electrical continuity which makes a path for the current induced in the conductive liquid. The pressure developed in the duct 3 is determined, according to equation (7), by the extent of decrease of the induction B of the resultant magnetic field in the air gap of the magnetic circuit 1, which is, in turn, determined by the given length l of the magnetic circuit portions 6 adjoining the duct 3. By the action of this pressure, the conductive liquid is moved in the duct 3 as shown by the arrows at the velocity $\bar{U}$.

Figure 5:
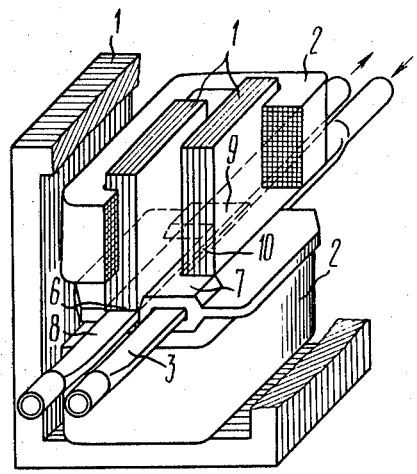
FIG. 5 is an axonometric view of an electromagnetic induction pump according to the invention, wherein provision is made of one additional duct with a busbar.

In the embodiment of an electromagnetic induction pump depicted in FIG. 5, pressure is developed in both the main duct 3 and the additional duct 8. The electromagnetic interaction in each of the ducts 3 and 8 is analogous to that in the embodiment of FIG. 1, but decrease of the magnetic induction and, consequently, pressure build-up and liquid flow have opposing directions. This is attributed to the fact that in the main duct 3 and the additional duct 8 the means for electrical continuity are constructed as the busbars 7 and 9 which embrace the magnetic circuit 1 at opposite ends with respect to the longitudinal axes of the ducts. The electric connection of the busbars 7 and 9 in the portion 10 results in the currents induced in the main duct 3 and the additional duct 8 in the portion 10 having opposing directions and, therefore, the resultant current in each cross section of this portion 10 is less than the current in the other portions of the busbars 7 and 9 (i.e. in the portions thereof which are not interconnected) and, referring to FIG. 3, depends on distribution of the current along the length of the main duct 3 and the additional duct 8, as determined by the given length l.

The pump embodiment depicted in FIG. 6 differs in operation from the embodiment described above in that the magnetic fluxes passing through the main duct 3 and the additional duct 8 are each arranged to take a continuous path through their respective open magnetic circuits 11 and 12.

The pump embodiment of FIG. 7 operates substantially like those of FIG. 5 or 6, except that, inasmuch as the main duct 3 and the additional ducts 8 are in series communication, the pressures developed in the main duct 3 and the additional ducts 8 add up and, as a result, the conductive liquid is caused to flow in the united duct by the action of the total pressure.

For pumping a conductive liquid without recourse to electrical contact between the conductive liquid and hard electrodes, the excitation winding 2 (FIG. 8) is connected to an alternating current source and electric current is induced in the liquid contained in the chamber parts 16 and 17, said electric current taking a path through the conductive liquid 4 around the piece 18 of the magnetic circuit 1.

In the conductive liquid 4 contained in the chamber part 14 situated in the air gap of the magnetic circuit 1 a resultant magnetic field is set up which is produced by the magnetic field set up in the magnetic circuit air gap by the excitation winding 2 and the field of the current induced in the conductive liquid 4. This resultant magnetic field in the air gap of the magnetic circuit 1 has its induction decreasing toward the outlet piece 20. The electromagnetic pressure developed in the conductive liquid 4 contained in the chamber part 16 situated in the air gap of the magnetic circuit 1 is determined, according to equation (7), by the extent of decrease of the magnetic induction in the air gap of the magnetic circuit 1. The conductive liquid entering the chamber through the inlet piece 19 is moved through the chamber parts 17 and 16 by the action of said electromagnetic pressure and is discharged through the outlet piece 20 from the part 16 of the chamber.

The partitions 21 (FIG. 9) provided on the borders between the chamber part 16 situated in the air gap of the magnetic circuit 1 and the chamber part 17 situated outside that air gap restrict circulation of the conductive liquid in the chamber, which leads to an increase in the pressure developed by the pump, and the conductive liquid 4 entering through the inlet piece 19 moves through the chamber part 17 between the partitions 21, passes into the chamber part 16 and is discharged by the electromagnetic force through the outlet piece 20.

Figure 10:
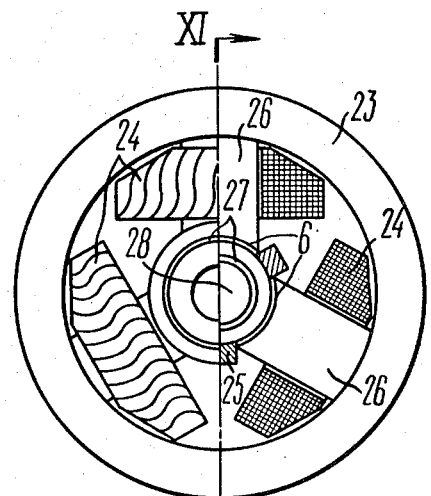
FIG. 10 is a fragmentary cross sectional view of a three-phase electromagnetic induction pump according to the invention, wherein the duct is cylindrically shaped and the poles of the magnetic circuit are spaced around the duct circumference.
Figure 11:
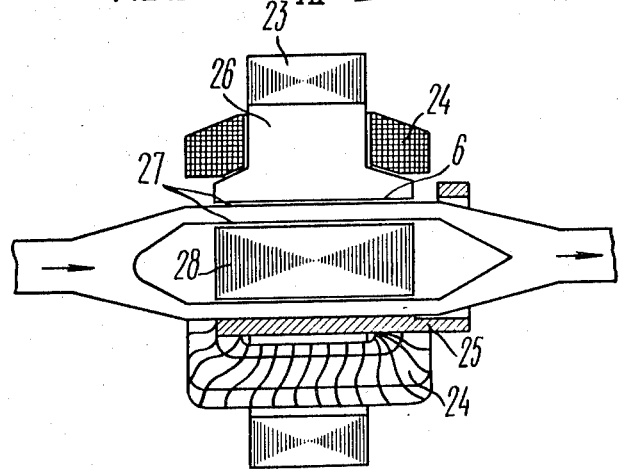
FIG. 11 is a sectional view along the line XI—XI of FIG. 10 according to the invention.
Figure 17A:
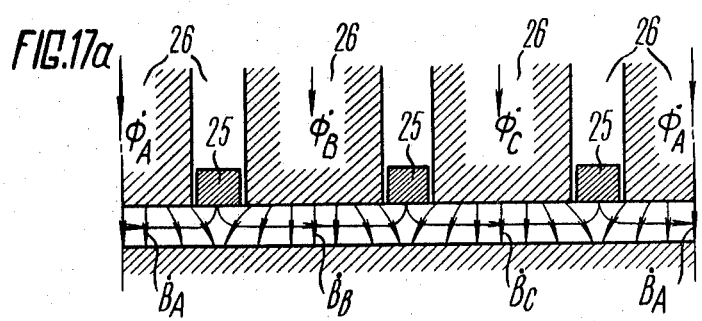
FIGS. 17 and 17b show development of the cylindrically shaped duct in two projections of the pump of FIG. 10, indicating the directions of the magnetic fields of the induction B and the electric currents of the density j in the conductive liquid and the busbars, and further show the directions of the velocity U of the liquid flow under the action of the produced electromagnetic forces.
Figure 17B:
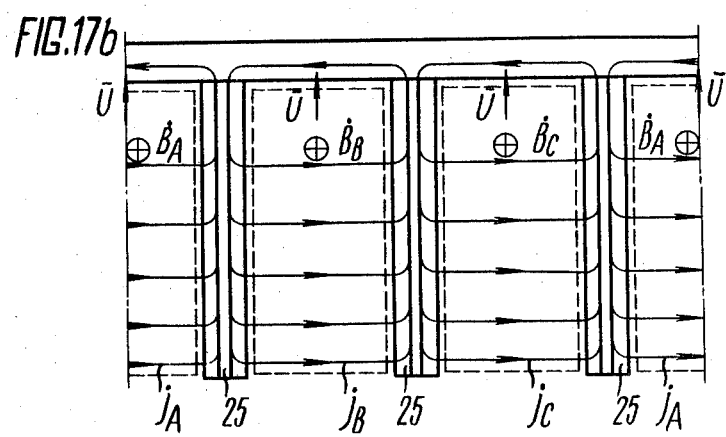

The pump embodiment depicted in FIGS. 10 and 11 operates as follows:

When the excitation winding 24 is connected to a three-phase current source, magnetic fluxes $\phi_A$, $\phi_B$ and $\phi_C$ (FIG. 17a) are set up in each of the poles 26 of the three-pole magnetic circuit 23, which magnetic fluxes vary with time at the frequency of the current source and are spaced 120° apart in time. Electromagnetic processes analogous to those observed in the air gap of the magnetic circuit 1 of the single-phase pump embodiment depicted in FIGS. 1 and 2 take place in the air gaps between the poles 26 (FIGS. 10 and 11) of each of the phases and the inner core 28. As a result, magnetic fields of the inductions $\dot{B}_A$, $\dot{B}_B$ and $\dot{B}_C$ (FIG. 17b) are set up in these air gaps, which inductions decrease in the direction of the conductive liquid flow, are equal in amplitude and spaced 120° apart in time; and, decreasing electric currents of the densities $j_A$, $j_B$ and $j_C$ are induced across the conductive liquid flow, said currents being also spaced 120 apart in time. These currents take a continuous path through the busbars 25 whose portions situated between the poles 26 are electrically interconnected. Inasmuch as currents from the two adjacent phases, spaced 120° apart in time, flow through each of such portions of the busbars 25, the amplitude of the total current in this portion is equal to the amplitude of the current produced in the conductive liquid by the field of one of the phases. This gives substantial reduction of electrical power losses in the busbars as compared with the analogous embodiment of the single-phase pump variant of FIGS. 1 and 2. This also intensifies, though not as substantially as in the embodiments of FIGS. 5 and 6, the decrease of the magnetic induction in the air gaps in the direction of the conductive liquid flow.

Interaction of the electric currents with the magnetic field of each of the phases produces electromagnetic forces in the conductive liquid, which forces cause the liquid to move in the duct at a velocity $\overline{U}$ in the directions indicated by the arrows.

Figure 14:
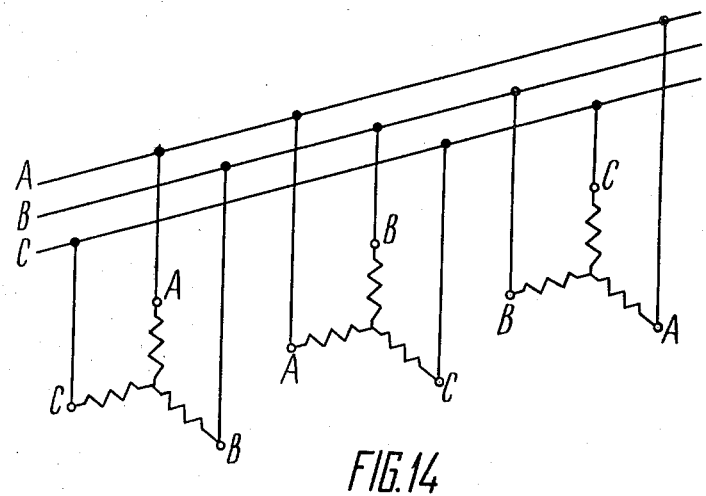
FIG. 14 shows a variant of connection of the pump of FIG. 12, to a three-phase alternating current supply, indicating phase sequence along the length of the duct and around the circumference thereof.

Each additional three-pole magnetic circuit 29 (FIGS. 12 and 13) with the three-phase excitation winding 30 functions essentially in the manner described for the previous embodiment. It will be noted, that the pressure developed by each of the three-pole magnetic circuits 23 and 29 with their respective three-phase windings 24 and 30 pulsates in time at the double frequency of the current feeding the excitation windings 24 and 30. Inasmuch as in each additional magnetic circuit 29 the phases differ by 120°, as shown in FIG. 14, from the preceding, as regards the direction of the conductive liquid flow, magnetic circuits 23 and 29, respectively, the pulsating in time pressures developed by each of the three-pole magnetic circuits 23 and 29 with their respective excitation windings 24 and 30 add up with the result that the outlet electromagnetic pressure is constant with respect to time.

The pump embodiment of FIG. 15 operates substantially like the embodiment of FIGS. 1 and 2, the magnetic flux in the air gap of the magnetic circuit 1 being distributed through the cross section of the pole piece 34 in accordance with the law governing distribution of the magnetic induction B (FIG. 16) along the length of the pole piece 34.

The proposed construction of an electromagnetic induction pump provides for the maximum decrease of the magnetic induction in the magnetic circuit air gap in the direction of the conductive liquid flow due to the action of the currents induced in the conductive liquid and, consequently, enables the maximum possible pressure to be obtained in the duct. It is known that the average value of the magnetic induction $B_s$ (FIG. 16) in the magnetic circuit air gap is at a minimum when the rate of decrease of the induction in that gap is at a maximum. According to the invention, with the length l increasing, the full magnetic flux in the magnetic circuit air gap remains approximately invariable, the same as the power input to the duct. Since the developed pressure reaches a maximum, the mechanical power developed at permissible velocities of the liquid flow in the duct is also at a maximum. Due to substantial increase of the power developed in the duct at an invariable power input, pump efficiency increases materially (see FIG. 4 for increase of pump efficiency with the parameters $\lambda$ and $Re_m$, since these parameters are proportional to the length l).

According to the invention, the full magnetic flux in the duct and the pump power input remain approximately invariable with an increase in the length l. Hence, the mass of the magnetic circuit and the excitation winding also remains invariable. As a result, improvement is obtained in the pump specific parameters, viz., mass per unit power and pressure per unit length l of the pole pieces adjoining the duct. The increase of the pressure in the duct with increase in the length l is substantially due to increase of the internal inductance of the conductive liquid in the duct, which leads to a substantial closeness between the phases of the magnetic induction and the density of the current in the conductive liquid.

A test was made of an electromagnetic induction pump embodying the present invention, comprising pole pieces adjoining the duct over the length l=150 mm and a means for electrical continuity constructed as a copper busbar. The pump handled a liquid alloy of gallium and indium, operating on a 50 Hz alternating current supply. Pump variants with different duct flow areas developed pressures from 8 to 12 kgf/cm². The maximum efficiency at low flow rates ws 11 percent. The value $2\sqrt{2/\sigma\mu_o\omega}$ for the pump variants under test was 100 mm, i.e. a 1.5 times increase of the length l of the pole pieces (since l=150 mm).

Provision of the main and additional ducts in one air gap of an open magnetic circuit makes possible further improvement in the pump specific parameters, viz. mass per unit power and duct pressure per unit length. By arranging the main and additional ducts in series communication the pump is enabled to develop a greater pressure than the embodiment comprising only one duct. The electrical interconnection between the busbars of the adjacent ducts decreases the electric currents in the interconnected portions, whereby electric power losses in the busbars are reduced, while pump efficiency is further increased.

A test was made on an electromagnetic induction pump comprising a main duct and two additional ducts in series communication with the main one, each of the three ducts being situated between pole pieces of the length l=150 mm. The pump handled an alloy of gallium and indium, operating on a 50 Hz alternating current supply. A pressure of 14 kgf/cm$^2$ was reached. Increasing the number of additional ducts in series communication increases the pressure developed by the pump.

The use of the conductive liquid being pumped as a means for electrical continuity eliminates the need for hard electrodes in contact with the conductive liquid, which substantially enhances the operational dependability of the pump and widens the field of its application. Furthermore, the duct can be made of ceramic and other non-conductive materials. With this constructional arrangement of the pump, the conductive liquid being pumped can be moved throughout the pump chamber, which prevents it from cooling or overheating in the chamber, as may be the case with melted metals, and prevents settling in the chamber of impurities from the conductive liquid being pumped. Still another advantage is that the pump chamber can be fully primed before starting up the pump and fully emptied after the pump is disconnected from the electrical supply.

Inasmuch as the resistance of the conductive liquid contained in the chamber part situated outside the magnetic circuit air influence the value of the electric current flowing in the conductive liquid in the chamber part situated in the magnetic circuit gap, the pressure developed in the pump embodiment concerned, with the given length l of the magnetic circuit portions adjoining the duct, is somewhat lower than the pressure developed by the pump embodiment wherein a busbar constitutes a means for electrical continuity. Nevertheless, the pressure produced by this embodiment at the given length l is greater than that of the prototype, the field of pump application being substantially widened.

A test was made on an electromagnetic induction pump comprising a means for electrical continuity constituted by the conductive liquid being pumped, the length of the pole pieces adjoining the chamber being 150 mm. The pump handled an alloy of gallium and indium, operating on a 50 Hz alternating current supply. The pressure obtained was up to 2 kgf/cm$^2$.

The constructional arrangement wherein the duct is cylindrically shaped, the adjoining portions of the poles of the three-pole magnetic circuit with a three-phase excitation winding are disposed round the duct circumference, and the busbars of the adjacent poles are electrically interconnected enables the duct flow area to be approximately three times as large as that in the single-duct variant of the single-phase pump.

With this construction, the proper relationship is maintained, as necessary to obtain the required pressure, between the length of the magnetic circuit portion adjoining the duct and its width in each of the magnetic circuit poles installed around the duct circumference. In this case the electric current flowing in the conductive liquid and taking therethrough a path between the two adjacent interconnected busbar portions does not spread excessively beyond the magnetic circuit air gap so that there is no decrease of pressure, nor reduction of pump efficiency at increased output. Due to reduction of relative electric power losses in the busbars as compared with the single-phase pumps, the overall pump efficiency increases.

The use of a three-phase excitation winding provides for more uniform loading of the phases of a three-phase alternating current supply, as compared with the power supply of the single-phase pump.

The use of a three-pole magnetic circuit with a three-phase excitation winding improves the pump specific parameters, viz. duct pressure per unit length and mass per unit power.

A test was made on an electromagnetic induction pump comprising a three-pole magnetic circuit, a three-phase excitation winding and a cylindrical duct, with the pole piece length l=100 mm. The pump handled an alloy of gallium and indium, operating on a 50 Hz alternating current supply. The maximum pressure obtained was 3 kgf/cm$^2$. The value $2\sqrt{2/\sigma\mu_o\omega}$ was, like the length of the pole pieces, 100 mm, i.e. the relation was observed for the minimum length of the magnetic circuit portion adjoining the duct:

$$l = 2\sqrt{2/\sigma\mu_o\omega} = 100 \text{ mm}.$$

The pump embodiment comprising, apart from the main magnetic circuit, two additional three-pole magnetic circuits, each having a three-phase excitation winding and installed within the length of the duct. The excitation windings were connected to a three-phase electric current source in such a manner that in each additional magnetic circuit the phases differ by 120° from the preceding magnetic circuit. This embodiment includes the features described above and also provides for obtaining the following advantages along with increased output: pump pressure greater than that which can be produced by the pump embodiment having one magnetic circuit within the length of the duct; and, outlet pressure constant with respect to time, which may be necessary in many pump applications.

In each of the embodiments of the proposed pump at least one of the magnetic circuit portions adjoining the duct is constructed as a pole piece disposed so that at least one of the ends thereof extends beyond the magnetic circuit, which is made possible by the decreasing magnetic induction feature of the pump, whereby the pump specific parameter of mass per unit power is improved substantially.

All the advantages described herein lead eventually to enhancing pump effectiveness by virtue of increasing the working pressure and efficiency, and also make for higher operational dependability and wider application of the pump.

What is claimed is:

1. An electromagnetic induction pump comprising:
an open magnetic circuit;
an excitation winding provided on said magnetic circuit;
a source of alternating current connected to said excitation winding;
a duct for the flow of an electrically conductive liquid being pumped and situated in the air gap of said magnetic circuit;
a means for electric continuity positioned outside of said air gap and embracing portions of said magnetic circuit at an outlet end of said duct relative to the direction of flow, and providing a path for the electric current induced in said conductive liquid to flow outside said air gap of said magnetic circuit, which means is in electrical contact with said conductive liquid and partially embraces said magnetic circuit;
at least portions of said magnetic circuit adjoining said duct having a length l, in the direction of the liquid flow, which is defined by the expression:

$$l \geqq 2\sqrt{2/\sigma\mu_o\omega}$$

where
$\sigma$ = the specific conductivity of the conductive liquid being pumped;
$\mu_o$ = the magnetic permeability of the conductive liquid being pumped; and
$\omega$ = the angular frequency of the alternating current source feeding the excitation winding,
and provides a nearly exponential decrease of the magnetic induction in said duct along the length l, in the direction of the liquid flow, to the value determined by the given length l.

2. A pump as claimed in claim 1, comprising:
a busbar constituting said means for electrical continuity outside said air gap of said magnetic circuit and partially embracing said magnetic circuit portion adjoining said duct at the outlet, as regards the direction of the liquid flow, end thereof;
at least one additional duct for the flow of said electrically conductive liquid being pumped and situated in said air gap of said magnetic circuit, each of said additional ducts being disposed in relation to the adjacent duct without overlapping in the direction of the magnetic field in said air gap;
at least one additional busbar, the number of additional busbars being equal to the number of said additional ducts, each being in electrical contact with said conductive liquid in the respective duct and partially embracing said magnetic circuit portion adjoining said duct so that said conductive liquid in each said additional duct flows in the same or in the opposite direction with respect to the flow in said adjacent duct;
said busbars of said adjacent ducts being electrically interconnected in order to intensify a decrease of the magnetic induction in said main and additional ducts, the direction of the induction decrease in each of said additional ducts being, respectively, the same as or opposite to the direction of the induction decrease in said adjacent duct.

3. A pump as claimed in claim 2, wherein, with said conductive liquid flowing in each additional duct in the direction opposite to the direction of flow in said adjacent duct, said main and additional ducts are in series communication in order to create a united flow of said conductive liquid and set up successive magnetic fields of decreasing induction in the direction of said united flow.

4. A pump as claimed in claim 2, wherein:
at least one of said magnetic circuit portions adjoining said duct for the flow of said conductive liquid is constructed as a pole piece;
at least one of the ends of said pole piece being an outlet end as regards the direction of flow of said conductive liquid and extending beyond said magnetic circuit, the areas of cross sections of said extending end taken along the length thereof in the direction of the conductive liquid flow being such that each cross section ensures passage of the magnetic flux determined for this section by said law of magnetic induction decrease along the length l of said pole piece.

5. A pump as claimed in claim 1, comprising:
a chamber defined by the walls of two tube portions situated one inside the other;
an inlet piece and an outlet piece for said conductive liquid being pumped in and out of said chamber and situated at different levels;
a peripheral part of said chamber situated in said air gap of said magnetic circuit and constituting said duct for the flow of said conductive liquid;
a second part of said chamber situated outside said air gap of said magnetic circuit, said conductive liquid conveyed therein by the action of electromagnetic forces produced in said chamber part situated in said air gap of said magnetic circuit providing a means for electrical continuity outside said air gap of said magnetic circuit in order to cater for decrease of the magnetic induction in said chamber part situated in said air gap of said magnetic circuit, from the chamber end whereat said magnetic circuit is installed inside said inner tube portion forming said chamber to the other end thereof.

6. A pump as claimed in claim 5, comprising:
partitions in said chamber part situated outside said air gap of said magnetic circuit, said partitions being disposed in the length of the chamber so as to limit circulation of said conductive liquid in said chamber, which circulation originates on the borders between said chamber part situated in of said air gap of said magnetic circuit and said second chamber part.

7. A pump as claimed in claim 6, comprising:
plates constituting said partitions and installed in two rows perpendicular to the direction of said conductive liquid flow in said chamber part situated in said air gap of said magnetic circuit, the working edges of each of said plates being located on the respective border between said chamber parts.

8. A pump as claimed in claim 5, wherein:
at least one of said magnetic circuit portions adjoining said duct for the flow of said conductive liquid is constructed as a pole piece;
at least one of the ends of said pole piece being an outlet end as regards the direction of flow of said conductive liquid and extending beyond said magnetic circuit, the areas of cross sections of said extending end taken along the length thereof in the direction of the conductive liquid flow being such that each cross section ensures passage of the magnetic flux determined for this section by said law of magnetic induction decrease along the length 1 of said pole piece.

9. A pump as claimed in claim 1, wherein:
at least one of said magnetic circuit portions adjoining said duct for the flow of a conductive liquid is constructed as a pole piece;
at least one of the ends of said pole piece being an outlet end as regards the direction of flow of said conductive liquid and extending beyond said magnetic circuit, the areas of cross sections of said extending end taken along the length thereof in the direction of the conductive liquid flow being such that each cross section ensures passage of the magnetic flux determined for this section by said law of magnetic induction decrease along the length l of said pole piece.

10. An electromagnetic induction pump, comprising:
a first three-pole open magnetic circuit;
a three-phase excitation winding provided on said magnetic circuit;
a three-phase alternating current source connected to said excitation winding;
a cylindrical duct for the flow of an electrically conductive liquid being pumped and situated in the air gap of said three-pole open magnetic circuit;
three busbars, each constituting a means for electrical continuity to provide a path for the electric current induced in said conductive liquid to flow outside said air gap of said magnetic circuit, said busbars being in electrical contact with said conductive liquid and partially embracing that respective portion of said magnetic circuit which adjoins said duct at the outlet, as regards the direction of the conductive liquid flow, end of said duct;
said portions of said magnetic circuit adjoining said cylindrical duct being spaced approximately equidistantly around the circumference thereof and having a length l in the direction of the conductive liquid flow which is defined by the expression:

$$l \geq 2\sqrt{2/\sigma\mu_o\omega}$$

where
$\sigma$ = the specific conductivity of the conductive liquid being pumped;
$\mu_o$ = the magnetic permeability of the conductive liquid being pumped; and
$\omega$ = the angular frequency of the alternating current source feeding the excitation winding, and provides a nearly exponential decrease of the magnetic induction in said duct along the length l, in the direction of the liquid flow, to the value determined by the given length l;
said busbars being electrically interconnected in order to set up in said duct identical magnetic fields of decreasing induction spaced 120° apart with respect to time.

11. A pump as claimed in claim 10, comprising:
a second three-pole open magnetic circuit and a third three-pole open magnetic circuit provided within the length of said cylindrical duct after said first magnetic circuit;
portions of second and third magnetic circuits which adjoin said cylindrical duct being approximately equidistantly spaced round the circumference thereof and having a length l in the direction of the conductive liquid flow, this length being equal to that of such portions of said first magnetic circuit;
three busbars, each constituting a means for electrical continuity outside said gap of the respective magnetic circuit, said busbars being in electrical contact with said conductive liquid and partially embracing that respective portion of said magnetic circuit, which adjoin said cylindrical duct at the outlet, as regards the direction of the conductive liquid flow, end of said duct;
said busbars being electrically interconnected in each of said second and third magnetic circuits;
three-phase excitation windings of said second and third magnetic circuits installed thereon and connected to said three-phase current source in such a manner that in each of said magnetic circuits the phases differ by 120° from the preceding, as regards the direction of the conductive liquid flow, magnetic circuit, in order to produce phase sequence matched to the circumference and length of said cylindrical duct and set up, in the portion of said duct situated between said poles of the respective magnetic circuit, a magnetic field of decreasing induction differing in time by 120° from such a magnetic field of the preceding, as regards the direction of the conductive liquid flow, magnetic circuit.

12. A pump as claimed in claim 11, wherein:
said portions of said first, second and third magnetic circuits which adjoin said cylindrical duct are constructed as pole pieces;
at least one of the ends of each of said pole pieces being an outlet end as regards the direction of the conductive liquid flow and extending beyond said magnetic circuit, the areas of cross sections of said extending end taken along the length thereof in the direction of the conductive liquid flow being such that each cross section ensures passage of the magnetic flux determined for this section by said law of magnetic induction decrease along the length l of said pole piece.

* * * * *